(12) United States Patent
Nichol

(10) Patent No.: US 10,633,291 B2
(45) Date of Patent: Apr. 28, 2020

(54) WINDOW MATERIAL FOR SEEKER MISSILES

(71) Applicant: NOKOMIS, INC., Charleroi, PA (US)

(72) Inventor: Robert M. Nichol, Washington, PA (US)

(73) Assignee: NOKOMIS, INC., Charleroi, PA (US)

(*) Notice: Subject to any disclaimer, the term of this patent is extended or adjusted under 35 U.S.C. 154(b) by 0 days.

(21) Appl. No.: 15/803,773

(22) Filed: Nov. 4, 2017

(65) Prior Publication Data

US 2019/0135702 A1 May 9, 2019

(51) Int. Cl.
| | | |
|---|---|---|
| *C04B 35/581* | (2006.01) | |
| *C04B 35/443* | (2006.01) | |
| *C04B 35/64* | (2006.01) | |
| *F42B 10/46* | (2006.01) | |
| *F42B 15/08* | (2006.01) | |

(52) U.S. Cl.
CPC .......... *C04B 35/581* (2013.01); *C04B 35/443* (2013.01); *C04B 35/64* (2013.01); *F42B 10/46* (2013.01); *C04B 2235/3206* (2013.01); *C04B 2235/3222* (2013.01); *C04B 2235/3225* (2013.01); *C04B 2235/3869* (2013.01); *C04B 2235/3873* (2013.01); *C04B 2235/3895* (2013.01); *C04B 2235/427* (2013.01); *C04B 2235/5204* (2013.01); *C04B 2235/612* (2013.01); *C04B 2235/763* (2013.01); *C04B 2235/9653* (2013.01); *F42B 15/08* (2013.01)

(58) Field of Classification Search
CPC ..... C04B 35/581; C04B 35/443; C04B 35/64; C04B 2235/3206; C04B 2235/763; C04B 2235/3869; C04B 2235/427; C04B 2235/3225; C04B 2235/3873; C04B 2235/3895; C04B 2235/612; C04B 2235/5204; F42B 15/08

See application file for complete search history.

(56) References Cited

U.S. PATENT DOCUMENTS

| | | | | |
|---|---|---|---|---|
| 6,939,908 | B1* | 9/2005 | Singhal | C08J 7/047 524/430 |
| 7,148,480 | B2* | 12/2006 | Zhan | B82Y 30/00 250/338.1 |
| 2009/0283720 | A1* | 11/2009 | Sweeney | B82Y 30/00 252/301.4 F |
| 2011/0315808 | A1* | 12/2011 | Zelinski | B82Y 20/00 244/3.16 |
| 2015/0077966 | A1* | 3/2015 | Bessho | G02B 5/0242 362/19 |

OTHER PUBLICATIONS

Mroz et al. Nanostructured, Infrared-Transparent MagnesiumAluminate Spinel with Superior Mechanical Properties. Int. J. Appl. Ceram. Technol., 9 [1] 83-90 (2012).*

* cited by examiner

*Primary Examiner* — Noah S Wiese
(74) *Attorney, Agent, or Firm* — AP Patents

(57) ABSTRACT

A window pane for an interceptor missile includes a light transmissive base material and light transmissive additive particles dispersed within a thickness of the light transmissive base material so as to define stress nodes, the stress nodes localizing, upon applied thermal shock or thermal heating, crack propagation around each stress node and/or between two or more adjacent stress nodes and preventing a continuous crack propagation through any one of a length, a width and a thickness of the window pane.

14 Claims, 2 Drawing Sheets

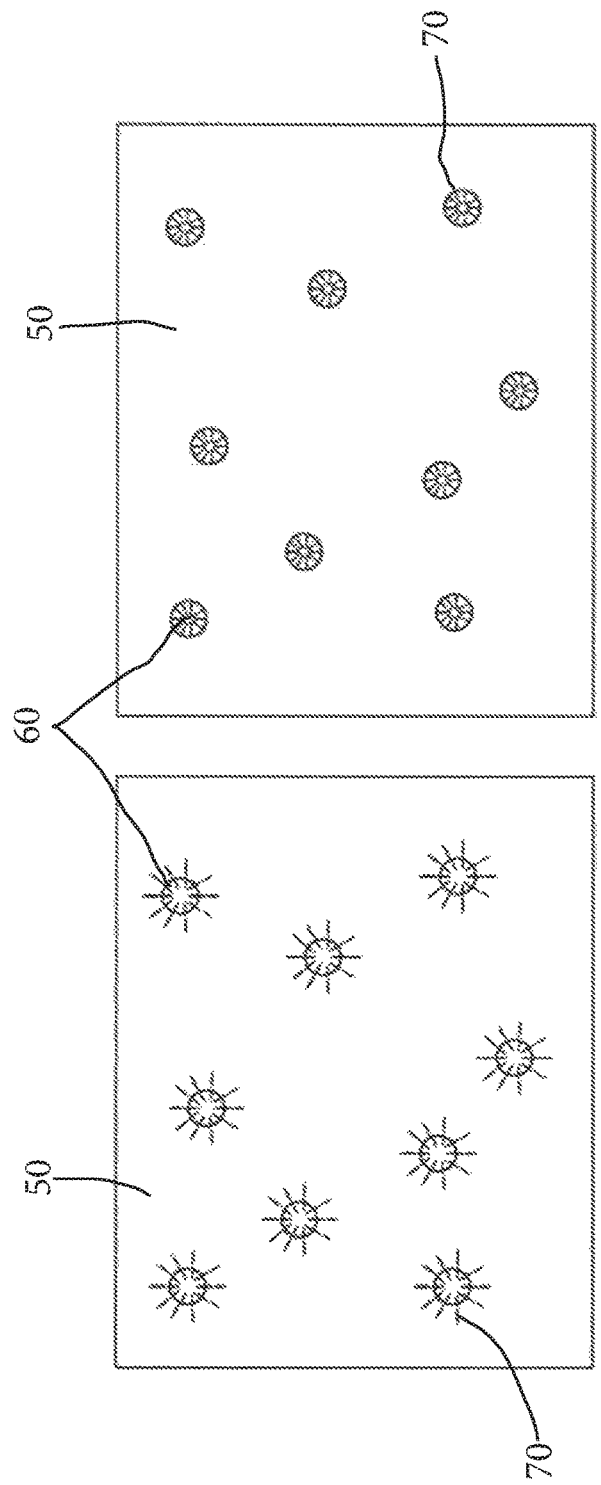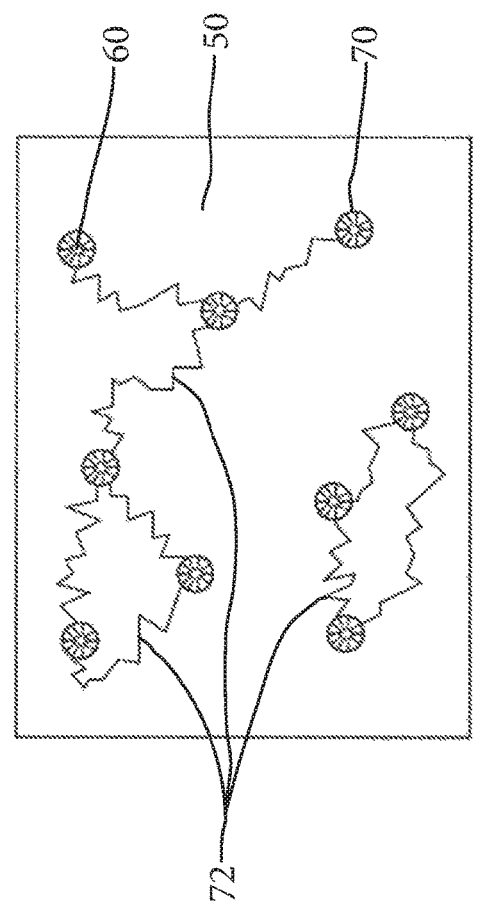

WINDOW MATERIAL FOR SEEKER MISSILES

CROSS-REFERENCE TO RELATED APPLICATIONS

Not Applicable

STATEMENT REGARDING FEDERALLY SPONSORED RESEARCH AND DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

1. Technical Field

The subject matter relates to window material that protects sensors in endoatmospheric or exoatmospheric seeker missiles.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present subject matter, or any embodiments thereof, to anything stated or implied therein or inferred thereupon.

As is generally known, seeker missiles are used to accurately detect, and seek targets utilizing optical guidance systems. The optical guidance system may comprise electro-optics/infrared (EO/IR) sensors that are mounted in a portion of a seeker missile behind a window covering a sensor aperture. The window protects the underlying sensors from the extreme endo-atmospheric environment of a missile, while allowing various wavelengths of light, including IR, to traverse through to the sensors for use in target acquisition and tracking data. The thermal shock impact and thermal shock resistance are of a significant importance for windows for optical guidance systems of missiles. High temperatures can change the physical as well as the optical properties of the window, such as the emissivity. EO/IR windows see enhanced IR emissivity at the tail end of their transmission profile, and since the window is closer than the target, this emissivity can over-power the target emissions and the window then acts as a noise or interference source, reducing the efficacy of the missile tracking system.

In addition to changes in optical properties, every window material has both a max operating temperature and a thermal shock limit. The max operating temperature is the temperature at which either emissivity becomes too high, or the temperature at which thermal-stress causes the window to fracture. Both high-temperatures and high temperature-change rates (thermal gradients) result in thermal stress. When a window material is heated rapidly, it is subject to expansion. If any or all of the thermal expansion coefficients (TCE) are too large for a given crystallographic orientations of window (ceramic) materials, this can result in thermal stress and consequently cracking upon rapid heating or cooling. A low thermal conductivity can further complicate this problem by allowing for temperature gradients and consequently, stress cracking.

The window must survive rain, cloud, and particle impact during flight. As missiles often achieve hypersonic speeds, any contact at the surface is associated with extremely high-velocity impact, requiring the window to be extremely hard and erosion resistant.

Window materials, manufactured by current conventional technologies, are disadvantaged in at least that they may be compromised by rapid heating rates and temperature ranges of the operating environment of interceptor missiles during missile travel at high speeds.

If windows for optical guidance systems of missiles are compromised, the missile may lose guidance and fail to hit its target. The window structure can be compromised when thermal shock, during missile travel, exceeds window capabilities and results in crack propagation through the window, where crack(s) reduce or prevent image capture by the optical guidance systems. In the case of a missile defense system, a failure of a hit to kill (HTK) interceptor may potentially result in mass human casualties and infrastructure damages. In a case of a nuclear exchange, failure of one the EO/IR windows on an interceptor missile may be an existential threat.

Therefore, there is at least a need for a new window material to at least improve resistance to thermal shocks.

BRIEF DESCRIPTION OF THE DRAWINGS

The accompanying drawings are incorporated in and constitute part of the specification and illustrate various embodiments. In the drawings:

FIGS. 3A-3C illustrate a construction of the window pane of FIGS. 1-2 with a further progression stresses applicable during operation of the missile.

DETAILED DESCRIPTION OF EXEMPLARY EMBODIMENTS

Figure 1:
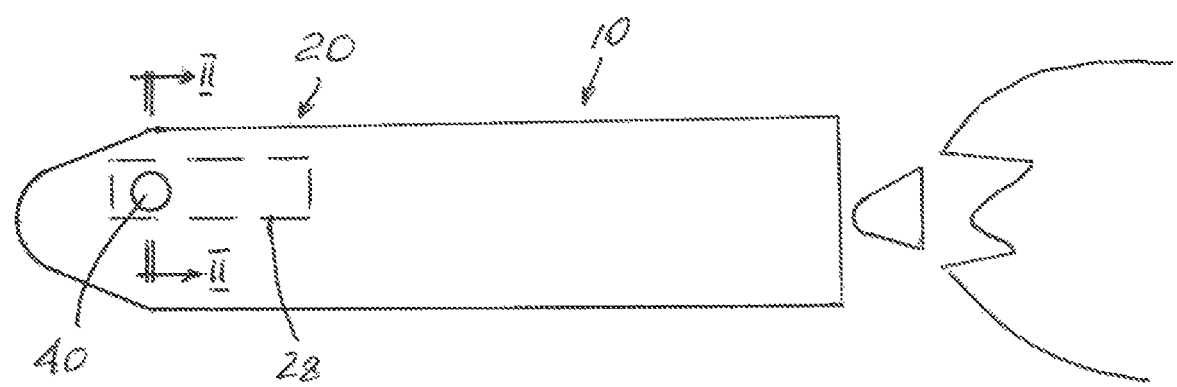
FIG. 1 illustrates a schematic diagram of a seeker missile employing an exemplary window pane.

Prior to proceeding to the more detailed description of the present subject matter, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific numerical values and other physical characteristics relating to the examples disclosed herein are not to be considered as limiting, unless the claims expressly state otherwise.

The terms and words used in the following description and claims are not limited to the bibliographical meanings, but, are merely used to enable a clear and consistent understanding of the exemplary embodiments.

The term "or" when used in this specification and the appended claims is not meant to be exclusive; rather the term is inclusive, meaning either or both.

The term "thermal shock" when used in this specification and appended claims should be broadly interpreted as an effect that rapid heating rates have on materials.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide compositions and methods directed to windows or window panes for optical guidance systems of missiles.

Figure 2:
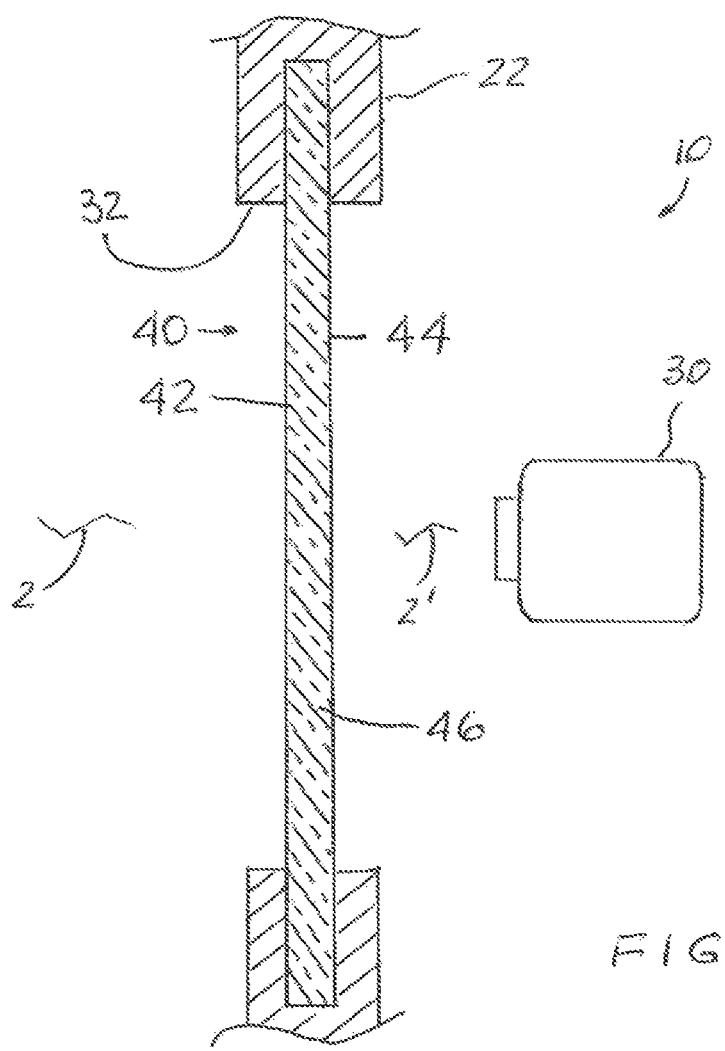
FIG. 2 illustrates a partial cross-sectional view of the window pane along lines II-II of FIG. 1.

Now in a reference to FIGS. 1-2, therein is shown schematic illustration of a seeker or an interceptor missile 10 that can be adapted with the windows of various embodiments disclosed below. The seeker or interceptor missile 10, generally has a seeker device 20 that may be contained in a separate housing 22 that is generally housed within a head of the missile 10. The seeker device 20 comprises an optical guidance system 28. The optical guidance system can comprises one or more sensors 30, each being generally mounted behind a window (or window pane) 40 covering an aperture 32 in the housing 22. Window pane 40 may be held by a resilient material gasket. Sensors may comprise camera(s) to receive electromagnetic energy 2, for example such as visible light that is being transmitted through the thickness of the window pane as 2'. All sensors may be mounted behind a single window pane 40 or multiple window panes 40 can be provided within the seeker missile 10, each for a specific sensor. The exemplary window pane 40 comprises a first surface 42, a second surface 44 that is spaced apart from the first surface 42 to define a thickness 46 of the window pane 40. As it has been said above, it is critical for the success of the missile mission to adequately protect optical guidance system 28 from thermal shock and may be further desirable to reduce cost of the window pane 40.

Essentially, the window pane 40 defines a multiphasic spinel-based window solution that is configured to withstand thermal shock applicable during operation of the missile 10 and control crack propagation.

In an embodiment, the window pane 40 comprises a first member 50 or a light transmissive base material comprising from about 90% to about 99.9% by weight and a second member 60 or a light transmissive additive material comprising from about 0.1% to about 10% by weight. In an example, a material composition of the first member 50 can comprise from about 90.0% to about 95.0% by weight and a second member 60 or a light transmissive additive material comprising from about 5.0% to about 10% by weight. In an example, the first member 50 can comprise from about 95.0% to about 99.9% by weight and a second member 60 or a light transmissive additive material comprising from about 0.1% to about 5.0% by weight. In an example, the first member 50 can comprise from about 93.0% to about 97.0% by weight and a second member 60 or a light transmissive additive material comprising from about 3.0% to about 7.0% by weight.

The light transmissive base material can be any one of $Mg_\alpha Al_\beta O_\gamma N_\eta$ spinel-based material and Magnesium Aluminum Oxide spinel-based (MAS or $MgAl_2O_4$) material. The light transmissive base material can be also referred to as a bulk material. In $Mg_\alpha Al_\beta O_\gamma N_\eta$ spinel material (here-after referred to as MgAlON), $\alpha$ can be between 0.2 and 0.35, $\beta$ can be between 2 and 3, $\gamma$ can be between 3.5 and 4, and $\eta$ can be between 0 and 0.5.

The light transmissive additive particle can be any one of MgAlON, nano-crystalline diamond (NCD), $Si_3N_4$, and Yttria.

In an example, the composition of the window pane 40 comprises MAS as the light transmissive base material and Yttria as the light transmissive additive particles.

In an example, the composition of the window pane 40 comprises MAS as the light transmissive base material and MgAlON as the light transmissive additive particles.

In an example, the composition of the window pane 40 comprises $Mg_\alpha Al_\beta O_\gamma N_\eta$ as the light transmissive base material and Yttria as the light transmissive additive particles.

In an example, the composition of the window pane 40 comprises $Mg_\alpha Al_\beta O_\gamma N_\eta$ as the light transmissive base material and $Si_3N_4$ as the light transmissive additive particles.

In an example, the composition of the window pane 40 comprises $Mg_\alpha Al_\beta O_\gamma N_\eta$ as the light transmissive base material and NCD as the light transmissive additive particles.

Now in a reference to FIGS. 3A-3C, the particles of the second member 60 is dispersed within a thickness of the first member 50 so as to define stress nodes 70. Each stress node 70 is defined by a particle of the second member 60. During use, the stress nodes 70 localize, upon applied thermal shock or thermal heating, crack propagation 72 around each stress node 70 and/or between two or more adjacent stress nodes 70 and prevent a continuous crack propagation 72 through any one of a length, a width and a thickness of the first member 50. In an example, a diameter of each particle of the second member 60 is smaller than a wavelength of the electromagnetic energy 2, for example such as visible light, traveling therethrough. This is advantageous because it allows a through transmission of the wavelength substantially reducing the opaqueness, and wavelength attenuation of the material.

In any of the embodiments, the first member 50 and the second member 60 can be provided in a ratio from about 999:1 to about 9:1, respectively. In an example, the ratio can be from about 999:1 to about 99:1. In an example, the ratio can be from about 999:1 to about 499:1. In an example, the ratio can be from about 499:1 to about 99:1. In an example, the ratio can be from about 99:1 to about 9:1.

The composition provides a polycrystalline structure where particles (phases) of the second member 60 are dispersed (distributed) randomly within the (bulk) first member 50. When the first member 50 and second member 60 are obtained as nanocrystalline particles less than 100 nm in size each, the random dispersion (distribution) is achieved by shaking the mixture in a container, for example such as a vial, for 1 minute. When the first member 50 and second member 60 are obtained as aggregate or conglomerate particles larger than 100 nm in size each, the random dispersion (distribution) is achieved by ball milling the mixture, which would both reduce the particle size below 100 nm and also mix the first member 50 and second member 60. The random dispersion (distribution) localizes crack propagation 72 around each stress node 70 or between two or more stress nodes 70 but prevents crack propagation 72 between a pair of side edges of the window pane 40 and/or between the surfaces 42 and 44. In other words, this ensures that the thermal-stress is localized around the distributed phases, inhibiting the formation of high-stress planes or paths, which would otherwise act as fracture paths/planes. The distributed second member 60 enhances the bulk thermal conductivity of the window pane 40, resulting in a reduced thermal-stress and stress-gradients upon rapid heating. Furthermore, the distributed nodes 70 provide stress reduction mechanism via compression induced nano-cracking in the distributed second member, reducing overall stress in the window pane 40.

Now in a reference to FIGS. 3A-3C, the window pane 40 of the above described embodiments comprises four thermal-shock mitigation pathways when the particles of the second member 60 are provided as non-particle phases:

1) Enhanced thermal conductivity—the distributed nano-phases are selected such that they enhance the bulk thermal conductivity of the window pane 40, resulting in reduced thermal-stress and stress-gradients upon rapid heating.

2) Phase boundary stress reduction/localization of FIG. 3A—the distributed phases are selected such that upon heating of the window pane 40, these phases provide "give", reducing overall stress in the window pane 40. In addition, this ensures that thermal-stress is localized around the distributed phases, inhibiting the formation of high-stress planes or paths, which would otherwise act as fracture paths/planes.

3) Interphase nano-cracking of FIG. 3B—as the window pane 40 continues to rapidly heat during missile travel, the distributed nano-phases will continue to "give" until interphase nano-cracking occurs. This interphase cracking can provide large-scale stress relief throughout the window pane 40 and increase the thermal shock resistance of the window.

4) Controlled crack-propagation of FIG. 3C—the high-stress sites at the nano-phases act as both crack formation and termination sites, controlling the path and propagation of cracks 72 as the heating continues. This internal slow-shatter phenomenon can be, in principle, comparable to a nano-sized safety-glass, retaining some mechanical integrity through the bulk failure mode similar to an impacted automobile window.

In the window pane 40, the nano-cracking is significantly smaller than the wavelengths of light for Visible and Infrared radiation, thus significantly reducing scattering and consequently maintaining transmissivity.

The resulting window pane 40, in an accordance with the above described embodiments, can demonstrate fracture/erosion resistant similar to sapphire windows, and a better thermal shock resistance than any of the conventional transparent ceramic materials used in fabrication of windows.

The resulting window pane 40, in an accordance with the above described embodiments, can also demonstrate high hardness, wear resistance, and broadband transmittance.

The window pane 40 in any of the above embodiments, is resistant to both high temperatures and rapid temperature changes (thermal shock resistance), exhibits controlled, predictable, and non-catastrophic failure, exhibits high broadband transparency, with special emphasis on the Near Infrared (NIR) to Mid-wave Infrared (MWIR) bands, exhibits a low emissivity for all operating temperature ranges, and provides extremely high fracture and erosion resistance.

After the first member 50 and the second member 60 are mixed, the window pane 40 can be manufactured by first using a sintering process (creating particle dispersion) and then polishing and lapping the surfaces. The sintering process and resulting window density can be enhanced by employment of high-sinterability nano-particle precursors. The sintering can be accomplished by employing reactive microwave assisted sintering in a controlled atmosphere. This form of processing can result in a much denser window structure than more traditional pressurized sintering methods. The use of microwaves to directly heat the reactants allows for quicker processing times, lower temperatures, and an ability to achieve novel structures that are difficult to achieve by conventional sintering methods. After sintering operation, the surface of the sintered mixture are polished, preferably to less than 1 Ra (μin). Flatness and parallelism of the window pane 40 are generally subject to equipment tolerance.

Thermal shock resistance can be measured directly by in-situ measurement of hardness and modulus via Impulse Excitations Technique. This technique non-destructively evaluates the Young's Modulus, Shear Modulus, internal friction/damping, and Poisson's Ratio. These are key mechanical properties of the window material related to thermal shock and these measurements can be performed during thermal-shock testing to evaluate property degradation and providing dynamic measurements of these key material properties. The heating rapid for thermal shock testing can be −15° C./min, although another heating rate can be selected. The above not only probes thermal shock induced failure, but also allows differentiation between failure modes as well as allows better understanding of thermal shock affects onto window 40 under test. MIL-STD-810G Thermal Shock testing can then be utilized to confirm the ultimate failure points.

A measurement of mechanical properties of the window pane 40 can include any one of hardness, fracture strength, and Young's Modulus. The measurements of the window 40 can be compared against measurements on windows manufactured from sapphire material(s). Hardness can be measured via Knoop micro-hardness testing. A bend test can be performed to determine fracture strength and confirm the Young's Modulus of the window materials. The window pane 40 can be bent by a variable load, with the load incrementally increasing in value until fracture occurs. Both the force and strain can be recorded during testing and the plot of these values can be utilized to calculate the Young's Modulus of the material.

In an embodiment, a window pane 40 comprises a multiphasic composite approach with a structured material demonstrating very high hardness, wear resistance, and broadband transmittance is impregnated with a media of transparent nano-phases. The phases can include MgAlON, NCD, $Si_3N_4$, and Yttria. Yttria, even without nano-phase restriction, can drastically enhance thermal shock resistance in spinel window. The selection of these phases is selected to produce the desired thermo-physical properties, such as a hardness, thermal conductivity, and the coefficient of thermal expansion.

Table 1 compares Thermal Shock Resistance (TSR) values of the window pane 40 with other window materials during the different stages of stress mitigation and failure. Thermal shock resistance (TSR) values in Table 1 are normalized using TSR of 100 for SiC.

TABLE 1

Thermal Shock and Erosion Resistance of EO/IR window materials.

| Material | Failure Mode | TSR Coefficient | Erosion/impact resistance |
|---|---|---|---|
| Quarts | Single Stage-Uncontrolled crack growth | 3.4* | Moderate |
| Sapphire | Single Stage-Uncontrolled crack growth | 13* | Very High |
| ALON | Single Stage-Uncontrolled crack growth | 1.6* | Very High |
| MAS | Single Stage-Uncontrolled crack growth | 1.4* | Very High |
| Composite material of above embodiments | Stress Mitigation and Localization Stage | >20** | Very High |
| | Inter-granular Nano-cracking Stage | >40** | High |
| | Controller Crack Propagation Stage | >>50** | Decreasing |

*TSR values given at 300 C.
**Estimated TSR values.

In an embodiment, the window pane 40 is configured with a low TEC and high thermal conductivity that minimizes thermal stress experienced at higher temperatures, and during rapid heating and cooling.

In an embodiment, the window pane 40 achieves desired thermal shock resistance by controlling and reducing thermally induced stress.

The window pane 40 of the above described embodiments overcomes the disadvantaged associated with currently employed technologies for window panes for EO/IR optic applications that include Sapphire, Calcium fluoride, Fused Silica/Quartz, and Zinc Sulfide. Sapphire has been currently associated with the most robust solution. This is largely because of extremely high strength and hardness, as well as high thermal conductivity of the window pane 40. These physical properties allow sapphire windows to be mechanically robust, erosion/abrasion resistant, and able to sustain relatively high heating rates and high-temperatures, allowing its usage in some endo-atmospheric seeker missiles for short exposure times. However, Sapphire is a single crystal structure. Single crystals limit engineers in their ability to enhance a given material, they also provide intrinsic fracture paths along crystallographic directions, meaning fracture from any source results in uncontrolled crack growth and ultimately, window failure. The above described embodiments provide a polycrystalline material composition that controls crack propagation, thus preventing failures that can lead to inoperability of the window pane. Furthermore, Sapphire has higher than required hardness. This higher hardness of the Sapphire results in additional manufacturing expense when it comes to surface polishing of window panes by a diamond-turning process. Use of the above described materials reduce hardness of the resulting combination, as compared with that of Sapphire, that decreases manufacturing costs associated with polishing operation but without affecting resistance to thermal shocks or light (electromagnetic radiation) transmittance.

The window mane 40 of the above described embodiments overcome deficiencies associated with Quartz material. Quarts material with extremely low TEC and high melting point leads towards high thermal shock resistance. However, Quartz has three limitation, its low thermal conductivity, structure, and its strength. The low thermal conductivity allows heat gradients to build up in the material and, in spite of the low TEC, stress planes are formed, promoting crack formation. Since Quartz is an amorphous (non-crystalline) material, there are absolutely no stress pinning sites or crack termination points within the material and thus once a crack is initiated it is likely to propagate all the way through the window, shattering it. The window mane 40 of the above described embodiments overcome deficiencies associated with Fused silica as well as ZnS, CaF based solutions that do not provide the same mechanical integrity as sapphire and thus are at an increased risk of failure when utilized as forward-facing windows in seekers.

The window pane 40 of the above described embodiments above thereby avoids an immediate catastrophic failure of material under rapid heating and is associated with extended thermal shock resistance well beyond competing technologies.

In an embodiment, a distributed aperture sensor system comprises a plurality of manufactured sensors, each comprising an aperture and a corresponding window that provides, upon applied thermal shock or thermal heating, only a localized crack propagation by having light transmissive additive particles randomly impregnated into a light transmissive bulk base material.

In an embodiment, a distributed aperture sensor system comprises a plurality of manufactured sensors, each comprising an aperture and a corresponding window that provides, upon applied thermal shock or thermal heating, increased thermal conductivity by having high thermal conductivity additive particles randomly impregnated into a light transmissive bulk base material.

In an embodiment, a method of manufacturing a window pane for an interceptor missile comprises the steps of selecting a bulk base material; selecting an additive material; mixing particles of additive material with a bulk base material; sintering the mixture of the bulk base material and the particles of additive materials; and polishing surface of the sintered mixture. Each of the bulk base material and the additive material is a light transmissive material.

In an embodiment, a method of manufacturing a window pane for an interceptor missile comprises the steps of mixing particles of selected additive material with a selected bulk base material; sintering the mixture of the bulk base material and the particles of additive materials; and polishing surface of the sintered mixture. Each of the bulk base material and the additive material is a light transmissive material.

In an embodiment, an endoatmospheric or exoatmospheric seeker (interceptor) missile comprises a housing, a distributed aperture sensor system disposed within said housing and comprising a plurality of manufactured sensors, each comprising an aperture and a corresponding window that provides, upon applied thermal shock or thermal heating, increased thermal conductivity by having high thermal conductivity light transmissive additive particles randomly impregnated into a light transmissive bulk base material. The chosen exemplary embodiments of the claimed subject matter have been described and illustrated for practical purposes so as to enable any person skilled in the art to which it pertains to make and use the same. It will be understood that variations, modifications, equivalents and substitutions for components of the specifically described exemplary embodiments of the invention may be made by those skilled in the art without departing from the spirit and scope of the invention as set forth in the appended claims.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It should be appreciated that reference throughout this specification to "one embodiment" or "an embodiment" means that a particular feature, structure or characteristic described in connection with the embodiment is included in at least one embodiment of the disclosed subject matter. Therefore, it is emphasized and should be appreciated that two or more references to "an embodiment" or "one embodiment" or "an alternative embodiment" in various portions of this specification are not necessarily all referring to the same embodiment or the same variation. Furthermore, the particular features, structures or characteristics may be combined as suitable in one or more embodiments of the disclosed subject matter.

Similarly, it should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

To the extent that the appended claims have been drafted without multiple dependencies, it should be noted that all possible combinations of features which would be implied by rendering the claims multiply dependent are explicitly envisaged and should be considered part of the disclosed subject matter.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present subject matter. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the claimed subject matter are approximations, the numerical values set forth in the specific examples are reported as precisely as possible.

Any numerical value, however, inherently contains certain errors necessarily resulting from the standard deviations found in their respective testing measurements.

Anywhere the term "comprising" is used, embodiments and components "consisting essentially of" and "consisting of" are expressly disclosed and described herein."

Furthermore, the Abstract is not intended to be limiting as to the scope of the claimed subject matter and is for the purpose of quickly determining the nature of the claimed subject matter.

What is claim is:

1. A window pane for an interceptor missile, comprising:
a first surface and a second surface, said second surface being spaced apart from said first surface to define a thickness of said window pane;
a light transmissive base material comprising from about 90% to about 99.9% by weight, said light transmissive base material being disposed within said thickness between said first and second surfaces; and
a light transmissive additive material comprising particles dispersed within said light transmissive base material and within said thickness between said first and second surfaces, said light transmissive additive particles comprising from about 0.1% to about 10% by weight;
said light transmissive additive material being different than said light transmissive base material;
said base material and said particles defining a polycrystalline composition with stress nodes.

2. A window pane for an interceptor missile, comprising:
a first surface and a second surface, said second surface being spaced apart from said first surface to define a thickness of said window pane;
a light transmissive base material, said light transmissive base material being disposed within said thickness between said first and second surfaces; and
a light transmissive additive material comprising particles dispersed within said light transmissive base material and within said thickness between said first and second surfaces so as to define a polycrystalline composition with stress nodes, said stress nodes localizing, upon applied thermal shock or thermal heating, crack propagation around each stress node and/or between two or more adjacent stress nodes and preventing a continuous crack propagation through any one of a length, a width and said thickness of said window pane.

3. The window pane of claim 2, wherein each light transmissive additive particle is a nano-particle.

4. The window pane of claim 2, wherein said light transmissive base material is any one of $Mg_\alpha Al_\beta O_\gamma N_\eta$ spinel material and Magnesium Aluminum Oxide Spinel (MAS or $MgAl_2O_4$) material.

5. The window pane of claim 4, wherein said light transmissive base material is said $Mg_\alpha Al_\beta O_\gamma N_\eta$ spinel material, where $\alpha$ is between about 0.2 and about 0.35, $\beta$ is between about 2 and about 3, $\gamma$ is between about 3.5 and about 4, and $\eta$ is between about 0 and about 0.5.

6. The window pane of claim 2, wherein each light transmissive additive particle is any one of MgAlON, nano-crystalline diamond (NCD), $Si_3N_4$, and Yttria.

7. The window pane of claim 3, wherein said light transmissive base material comprises $Mg_\alpha Al_\beta O_\gamma N_\eta$ and wherein said light transmissive additive particles comprise Yttria.

8. The window pane of claim 2, wherein said light transmissive base material comprises MAS and wherein said light transmissive additive particles comprise MgAlON.

9. The window pane of claim 2, wherein said light transmissive base material comprises MAS and wherein said light transmissive additive particles comprise Yttria.

10. The window pane of claim 2, wherein said light transmissive base material comprises $Mg_\alpha Al_\beta O_\gamma N_\eta$ and wherein said light transmissive additive particles comprise $Si_3N_4$.

11. The window pane of claim 2, wherein said light transmissive base material comprises $Mg_\alpha Al_\beta O_\gamma N_\eta$ and wherein said light transmissive additive particles comprise NCD.

12. The window pane of claim 2, wherein said light transmissive base material comprises MAS and wherein said light transmissive additive particles comprise $Si_3N_4$.

13. The window pane of claim 2, wherein said light transmissive base material comprises MAS and wherein said light transmissive additive particles comprise NCD.

14. The window pane of claim 2, wherein said light transmissive base material comprises from about 90% to about 99.9% by weight and wherein said light transmissive additive material comprising from about 0.1% to about 10% by weight.

\* \* \* \* \*